US012545048B2

(12) United States Patent
Folds

(10) Patent No.: US 12,545,048 B2
(45) Date of Patent: Feb. 10, 2026

(54) TETHERED PENCIL DEVICE

(71) Applicant: Kristi Folds, Mariana, FL (US)

(72) Inventor: Kristi Folds, Mariana, FL (US)

( * ) Notice: Subject to any disclaimer, the term of this patent is extended or adjusted under 35 U.S.C. 154(b) by 21 days.

(21) Appl. No.: 18/619,289

(22) Filed: Mar. 28, 2024

(65) Prior Publication Data

US 2024/0351364 A1 Oct. 24, 2024

Related U.S. Application Data

(60) Provisional application No. 63/460,725, filed on Apr. 20, 2023.

(51) Int. Cl.
*B43K 25/00* (2006.01)

(52) U.S. Cl.
CPC .................................... *B43K 25/00* (2013.01)

(58) Field of Classification Search
CPC .... B43K 25/00; B43K 25/001; B43K 25/002; B43K 29/00; B43K 23/02; Y10T 24/1397; Y10T 24/1321
See application file for complete search history.

(56) References Cited

U.S. PATENT DOCUMENTS 264,593 A * 9/1882 Wright ............... B65H 75/4434 401/99
1,889,738 A * 11/1932 Nelson ................. B43K 23/002 401/52
3,883,253 A * 5/1975 Naruse ................... B43K 21/20 401/99
4,236,841 A * 12/1980 Jongeward ........... B43K 23/002 248/331
4,958,952 A * 9/1990 Willett ................. B43K 23/002 401/52
5,083,242 A * 1/1992 Piotrowski ........... B43K 23/001 362/253
5,358,348 A * 10/1994 Kennedy .............. B43K 23/002 401/99
5,947,623 A * 9/1999 Smith .................. B43K 23/001 211/69.8
6,394,677 B2 * 5/2002 Wang ...................... B43K 23/02 401/202
6,499,899 B2 * 12/2002 Sawyer ................ B43K 23/002 401/48

(Continued)

FOREIGN PATENT DOCUMENTS

KR 200419464 Y1 * 6/2006 ............. B43K 23/04
KR 20070029236 A * 3/2007 ............... B43K 7/00

(Continued)

*Primary Examiner* — Jason W San
*Assistant Examiner* — Matthew J Sullivan
(74) *Attorney, Agent, or Firm* — Brennan, Manna & Diamond, LLC

(57) ABSTRACT

A tethered pencil device is provided. The device is primarily comprised of a body, a tether anchor, a base, an eraser, and a tip. The body is preferably made of a metal or rigid plastic material and retains all the functions of any pencil known in the art. A tether connects the body of the device to the base, which is attached to a desk or other workstation. A button may be pressed to protrude a lead from the device in which a user may write. An eraser may remove any mistakes in writing. The body of the device may then be placed into a channel of the base for storage until the device is required again.

10 Claims, 3 Drawing Sheets

(56) References Cited

U.S. PATENT DOCUMENTS

| | | | | |
|---|---|---|---|---|
| 6,735,825 | B1 * | 5/2004 | Berman | B43K 23/001 24/3.13 |
| 6,979,142 | B1 * | 12/2005 | Chmelar | B43K 21/027 401/65 |
| 7,252,450 | B2 * | 8/2007 | Aguirre | A44C 5/0046 224/267 |
| 7,270,289 | B2 * | 9/2007 | Kish | A45F 5/004 242/280 |
| 7,461,989 | B1 * | 12/2008 | Dickover | B43K 25/00 401/48 |
| 7,470,076 | B1 * | 12/2008 | Dickover | B43K 23/002 401/48 |
| 8,100,598 | B2 * | 1/2012 | Killion | B43K 23/001 401/100 |
| 8,172,474 | B2 * | 5/2012 | Dickover | B43K 25/00 24/3.13 |
| 8,672,571 | B2 * | 3/2014 | Monzo | G09B 11/00 434/81 |
| 10,624,441 | B1 * | 4/2020 | Sullivan | B43K 19/14 |
| 10,800,204 | B2 * | 10/2020 | Kim | B43K 23/002 |
| 2004/0006850 | A1 * | 1/2004 | Wax | B43K 23/002 24/10 R |
| 2008/0205967 | A1 * | 8/2008 | Purvine | B43K 25/00 29/428 |
| 2011/0038659 | A1 * | 2/2011 | Andochick | B43K 21/08 401/48 |
| 2014/0270893 | A1 * | 9/2014 | Falkel | B43K 31/00 401/88 |
| 2017/0224095 | A1 * | 8/2017 | Redfern | B43K 23/008 |
| 2024/0351364 | A1 * | 10/2024 | Folds | B43K 25/00 |

FOREIGN PATENT DOCUMENTS

| | | | | | |
|---|---|---|---|---|---|
| KR | 200442608 | Y1 | * | 11/2008 | B43K 29/00 |
| KR | 20130006002 | U | * | 10/2013 | B43K 23/001 |

* cited by examiner

TETHERED PENCIL DEVICE

CROSS-REFERENCE TO RELATED APPLICATION

The present application claims priority to, and the benefit of, U.S. Provisional Application No. 63/460,725, which was filed on Apr. 20, 2023, and is incorporated herein by reference in its entirety.

FIELD OF THE INVENTION

The present invention relates generally to the field of pencils. More specifically, the present invention relates to a tethered pencil device. The device is comprised of a durable pencil comprised of a tether that connects the body of the device to the base, which is attached to a desk or other workstation. Accordingly, the present disclosure makes specific reference thereto. Nonetheless, it is to be appreciated that aspects of the present invention are also equally applicable to other like applications, devices, and methods of manufacture.

BACKGROUND

Pencils are a requirement for most school settings, regardless of grade level or age. However, most pencils can be easily broken, lost, forgotten, or in some way misplaced and not brought into class. Teachers must often supply their students with pencils when they come into a classroom without them. This can be an undesirable burden on the teacher.

Therefore, there exists a long-felt need in the art for an improved pencil. More specifically, there exists a long-felt need in the art for a tethered pencil device that prevents pencils from being lost. Furthermore, there exists a long-felt need in the art for a tethered pencil device that cannot be easily broken.

The subject matter disclosed and claimed herein, in one embodiment thereof, comprises a tethered pencil device. The device is primarily comprised of a body, a tether anchor, a base, an eraser, and a tip. The body is preferably made of a metal or rigid plastic material and retains all common functions of any pencil known in the art. A tether connects the body of the device to the base, which is attached to a desk or other workstation. During use, a button may be pressed to push lead out of the device for writing and an eraser may be used to remove any mistakes. Once the writing is completed, the body may be placed into a channel of the base for storage and safekeeping.

In this manner, the tethered pencil device of the present invention accomplishes all the foregoing objectives and provides an improved pencil. More specifically, the tethered pencil device can prevent pencils from being lost via the tether. Furthermore, the tethered pencil device cannot easily be broken.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a tethered pencil device comprised of a body, a tether anchor, a base, an eraser, and a tip. The device is designed to be attached to a desk to prevent the device from being lost, forgotten, or misplaced while the device is in use or set aside.

The device is comprised of a body that is preferably made from a metal or plastic material. The device preferably has all the common functions of any existing pencil known in the art. A first opening of the body may be comprised of a fastener that allows the body to attach to a fastener of a tether anchor. A second opening of the body may be comprised of a fastener that allows the body to attach to a fastener of a tip. A lead may be pushed out of an opening of the tip by a button of the body to allow a user to write with the device. The tether anchor may further be comprised of another fastener that allows the tether anchor to attach to a fastener of an eraser. The eraser is comprised of an eraser tip that allows the device to erase the marks left by the lead.

A tether is fixedly attached to the tether anchor on one end and is fixedly attached to a base on its other end. The base is further comprised of a bottom surface and a top surface. The bottom surface is further comprised of a fastener that allows the base of the device to be attached to a desk. The top surface of the base may be further comprised of a channel into which the pencil may be set or pressed.

The present invention is also comprised of a method of using the device. First, a device is provided comprised of a body, a tether anchor, a base, an eraser, and a tip. Then, a base is attached to a desk via a fastener of the base. Then, a lead is placed into the body of the device. Next, the fastener of the eraser may be attached to a fastener of the tether anchor. Then, the other fastener of the tether anchor may be attached to a fastener of a first opening of the body. Next, a fastener of a tip may be attached to a fastener of a second opening of the body. Finally, the lead may be pushed through an opening of the tip by pressing a button on the body of the device, allowing a user to write with the device.

Accordingly, the tethered pencil device of the present invention is particularly advantageous as it provides a device that improves a pencil when used in the setting of a classroom. More specifically, the tethered pencil device is durable such that it may not easily be broken. Furthermore, the tethered pencil device can prevent pencils from being lost by attaching the device to a workstation of a student. In this manner, the tethered pencil device overcomes the limitations of existing pencils known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
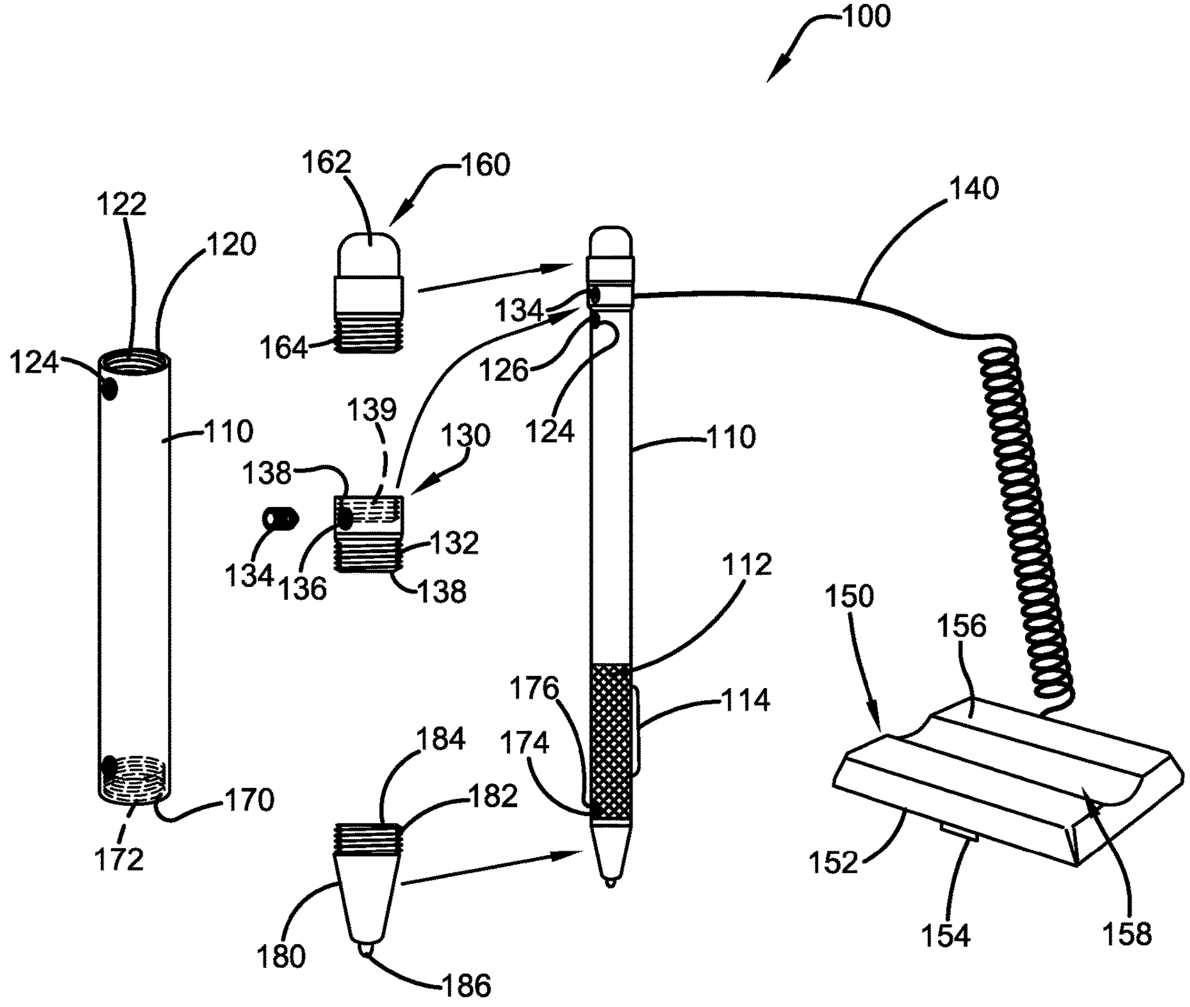
FIG. 1 illustrates a perspective view of one potential embodiment of a tethered pencil device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, any of the features described herein from different embodiments may be combined in other embodiments.

As noted above, there exists a long-felt need in the art for an improved pencil. More specifically, there exists a long-felt need in the art for a tethered pencil device that prevents pencils from being lost. Furthermore, there exists a long-felt need in the art for a tethered pencil device that cannot be easily broken.

The present invention, in one exemplary embodiment, is comprised of a tethered pencil device. The device is comprised of a body, a tether anchor, a base, an eraser, and a tip. The device is designed to be attached to a desk to prevent the device from being lost, forgotten, or misplaced while the device is in use or set aside.

More specifically, the device is comprised of a body that is preferably made from a hollow metal or rigid plastic material. The device also has all the functions of any existing pencil known in the art, such as an internal spring, a lead storage component, etc. The body is further comprised of a grip and a button. The grip may provide a user with a contact point to hold the device. The button may be pressed to activate the device mechanism that pushes a lead or another writing material through an opening of the tip of the device.

A first opening of the body may further be comprised of a fastener, a set screw opening, and a set screw. The fastener of the first opening is preferably female threads but may be any reciprocating fastener known in the art. The set screw opening is threaded to allow the set screw of the first opening to insert into the set screw opening to secure the first opening to a tether anchor. The tether anchor is further comprised of two fasteners, a set screw opening, and an opening. A fastener of the opening of the tether anchor is preferably male threads to attach to the fastener of the first opening of the body. The other fastener of the tether anchor is preferably female threads to attach to a fastener, preferably male threads, of an eraser. The connection between the tether anchor and the eraser may be further secured by twisting a set screw into the set screw opening of the tether anchor when the fastener of the tether anchor is fully attached to the fastener of the eraser. The eraser is further comprised of an eraser tip, preferably made from a synthetic rubber, to remove marks made by the lead on a sheet of paper or other surface.

In addition, a tether may be fixedly attached to the tether anchor. The other end of the tether may be fixedly attached to a base. The base may be further comprised of a bottom surface and a top surface. The bottom surface of the base may be further comprised of a fastener that allows the base to be removably attached to a desk or other flat surface. The top surface of the base may be further comprised of a channel into which the pencil may be set or pressed The body is also comprised of a second opening, which may be further comprised of a fastener and a set screw opening. The fastener of the second opening of the body is preferably female threads that may be screwed into a fastener, preferably male threads, of a tip. Once the fastener of the second opening of the body is fully attached to the fastener of the tip, a set screw may be screwed into the set screw opening of the second opening of the body to further secure the body to the tip of the device. The tip may be further comprised of an opening and a lead. The opening may allow the lead to protrude from the device while remaining attached to the device by pressing the button on the body of the device.

The present invention is also comprised of a method of using the device. First, a device is provided comprised of a body, a tether anchor, a base, an eraser, and a tip. Then, a base is attached to a desk via a fastener of the base. Then, a lead is placed into the body of the device. Next, the fastener of the eraser may be attached to a fastener of the tether anchor. Then, the other fastener of the tether anchor may be attached to a fastener of a first opening of the body. Next, a fastener of a tip may be attached to a fastener of a second opening of the body. Finally, the lead may be pushed through an opening of the tip by pressing a button on the body of the device, allowing a user to write with the device.

Accordingly, the tethered pencil device of the present invention is particularly advantageous as it provides a device that improves a pencil when used in the setting of a classroom. More specifically, the tethered pencil device can be attached to the workstation of a student or other person such that the device may not be easily lost or misplaced. Furthermore, the tethered pencil device is durable such that it may not easily be broken. In this manner, the tethered pencil device overcomes the limitations of existing pencils known in the art.

Referring initially to the drawings, FIG. 1 illustrates a perspective view of one potential embodiment of a tethered pencil device 100 of the present invention in accordance with the disclosed architecture. The device 100 is comprised of a body 110, a tether anchor 130, a base 150, an eraser 160, and a tip 180. The device 100 is designed as a writing utensil to be attached to a desk to prevent the device 100 from being lost, forgotten, or misplaced while the device is in use or set aside. In addition, the construction of the device 100 prevents young children from taking apart the device 100 during use.

The device 100 is comprised of a body 110 that is preferably made from a hollow metal or rigid plastic material. The device 100 preferably has all the common functions of any existing pencil known in the art, such as an internal spring, a lead storage component, etc. The body 110 may be further comprised of a grip 112 and a button 114. The grip 112 of the body 110 may be comprised of a different material than the body 110, such as rubber, to aid a user in gripping the device in a comfortable and ergonomic manner. The button 114 of the body 110 may be activated by pressing the button 114 into the body 110, pushing a lead 186 or any other writing material out of the device 100 to be written with.

A first opening 120 of the body 110 may be further comprised of a fastener 122 and a set screw opening 124. The fastener 122 of the first opening 120 of the body 110 is preferably female threads such that it may attach to a fastener 139 (preferably male threads) of an opening 138 of a tether anchor 130. Once the fastener 122 of the first opening 120 of the body 110 is fully attached to the fastener 139 of the opening 138 of the tether anchor 130, a set screw 126 may be screwed into the set screw opening 124 of the first opening 120 of the body 110 to further secure the tether anchor 130 to the body 110. This construction prevents the tether 140 from being removed from the body 110 by a young child.

The tether anchor 130 is further comprised of a second fastener 132 and a set screw opening 136. The fastener 132 on the opposing side of the tether anchor 130 is preferably female threads such that it may attach to a fastener 164 (preferably male threads) of an eraser 160. Once the fastener 132 of the tether anchor 130 is fully attached to the fastener 164 of the eraser 160, a set screw 134 may be screwed into the set screw opening 136 of the tether anchor, further securing the eraser 160 to the tether anchor 130 and preventing a young child from removing the eraser 160. The eraser 160 is further comprised of an eraser tip 162 that is preferably made of synthetic rubber material but may be made of any material commonly used for pencil erasers known in the art. The eraser tip 162 may be used to erase the markings left by the lead 186 of the device 100 during use.

Figure 2:
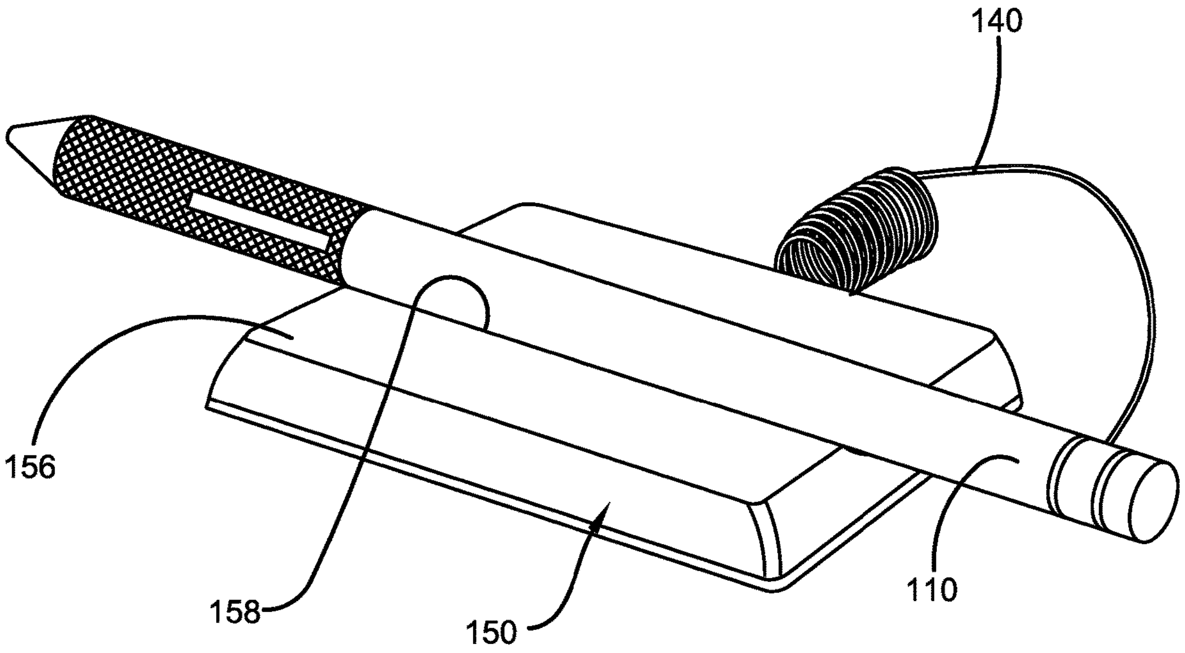
FIG. 2 illustrates a perspective view of one potential embodiment of a tethered pencil device of the present invention in accordance with the disclosed architecture.

FIG. 2 illustrates a perspective view of one potential embodiment of a tethered pencil device 100 of the present invention in accordance with the disclosed architecture. Fixedly attached to the tether anchor 130 is at least one tether 140. The tether 140 is also fixedly attached to a base 150. The base 150 is further comprised of a bottom surface 152 and a top surface 156. The bottom surface 152 of the base 150 may lay flat on a desk or other tabletop surface. The bottom surface 152 may be also comprised of a fastener 154 such that the base 150 may be removably attached to a desk. The fastener 154 of the bottom surface 152 is preferably an adhesive fastener but may be any fastener known in the art, such as, but not limited to, a magnet, a hook-and-loop fastener, an adhesive, a screw, a bolt, a nail, a sealant, etc.

The top surface 156 of the base 150 may be further comprised of a channel 158 in which the body 110 may be placed when the device 100 is not in use. In the embodiment in which the body 110 is metal, the base 150 may be magnetic to allow the body 110 to easily insert into the channel 158 of the base 150. In the embodiment in which the body 110 is plastic or any material other than metal, the channel 158 of the base 150 may be a lipped channel 158 such that the body 110 may be pressed into the channel 158 and be secured by the lips of the channel 158.

The body 110 is also comprised of a second opening 170. The second opening 170 is further comprised of a fastener 172 and a set screw opening 176. The fastener 172 of the second opening 170 of the body 110 is preferably female threads such that a fastener 182 (preferably male threads) of a tip 180 may screw into the fastener 172 of the second opening 170 of the body 110. Once the fastener 172 of the second opening 170 of the body 110 is fully attached to the fastener 182 of the tip 180, a set screw 174 may be screwed into the set screw opening 176 of the first opening 170 of the body 110 to further secure the tip 180 to the body 110 and prevent a young child from removing the tip 180. The tip 180 is further comprised of an opening 184 in which the lead 186 may protrude from the device 100 to be used in writing. The lead 186 may be pushed out of the device 100 by the pressing of the button 114 of the body 110 of the device 100. Each press of the button 114 may move the lead 186 a small distance out of the opening 184 of the tip 180 such that the distance in which the lead 186 is protruding from the tip 180 may be set to the preferences of a user.

Further, the fasteners 122,132,139,164,172,182 that connect the eraser 160, the tether anchor 130, the body 110, and the tip 180 may be any reciprocating fasteners known in the art such that the pairs of fasteners 122,132,139,164,172,182 can attach to one another. In another potential embodiment of the device 100, each of the fasteners 122,132,139,164, 172,182 may be comprised of tapered male and/or female threads, such that the set screws 126,134,174 and set screw openings 124,136,176 may not be required in the design of the device 100. In this embodiment, the attachment between the fasteners 122,132,139,164,172,182 would suffice in holding the device 100 together.

Figure 3:
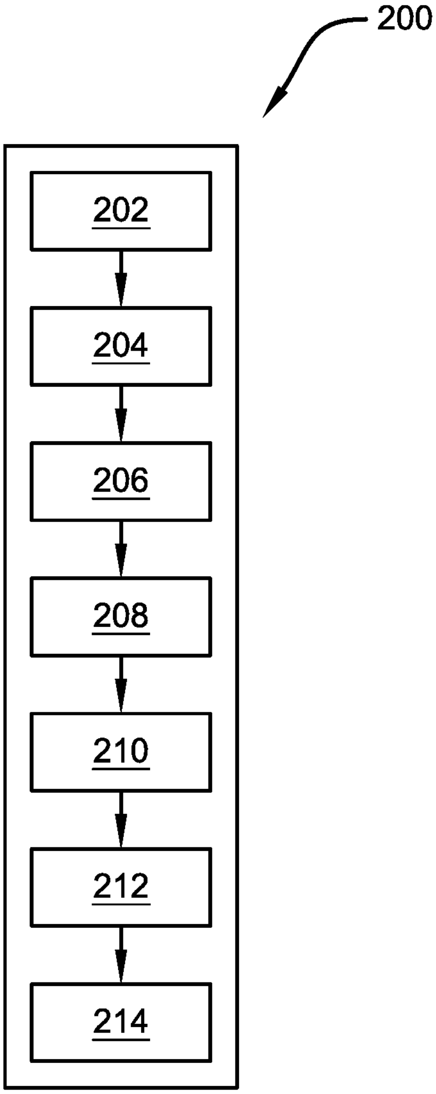
FIG. 3 illustrates a flowchart of a method of using one potential embodiment of a tethered pencil device of the present invention in accordance with the disclosed architecture.

The present invention is also comprised of a method 200 of using the device 100, as seen in FIG. 3. First, a device 100 is provided comprised of a body 110, a tether anchor 130, a base 150, an eraser 160, and a tip 180 [Step 202]. Then, a base 150 is attached to a desk via at least one fastener 154 of the base 150 [Step 204]. Then, at least one piece of lead 186 is placed into the body 110 of the device 100 [Step 206]. Next, the fastener 164 of the eraser 160 may be attached to a fastener 132 of the tether anchor 130 and secured via a set screw 134 [Step 208]. Then, the second fastener 139 of the tether anchor 130 may be attached to a fastener 122 of a first opening 120 of the body 110 and secured with a set screw 126 [Step 210]. Next, a fastener 182 of a tip 180 may be attached to a fastener 172 of a second opening 170 of the body 110 and secured with a set screw 174 [Step 212]. Finally, the lead 186 may be pushed through an opening 184 of the tip 180 by pressing a button 114 on the body 110 of the device 100, allowing a user to write with the device 100 [Step 214].

Certain terms are used throughout the following description and claim to refer to particular features or components. As one skilled in the art will appreciate, different persons, may refer to the same feature or component by different names. This document does not intend to distinguish between components or features that differ in name but not structure or function. As used herein "tethered pencil device" and "device" are interchangeable and refer to the tethered pencil device 100 of the present invention.

Notwithstanding the foregoing, the tethered pencil device 100 of the present invention and its various components can be of any suitable size and configuration as is known in the art without affecting the overall concept of the invention, provided that they accomplish the above-stated objectives. One of ordinary skill in the art will appreciate the size, configuration, and material of the tethered pencil device 100 as shown in the FIGS. are for illustrative purposes only, and many other sizes and shapes of the tethered pencil device 100 are well within the scope of the present disclosure. Although the dimensions of the tethered pencil device 100 are important design parameters for user convenience, the tethered pencil device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tethered pencil device comprising:

a body comprising a first threaded set screw opening, and a second threaded set screw opening;

a tether anchor comprising a third threaded set screw opening and being attached to one end of said body;

a base comprising a fastener for attachment to a support surface;

a tether fixedly attached to the base and to the tether anchor;

an eraser attached to said tether anchor;

a tip comprising a lead opening and attached to another end of said body; and a plurality of set screws respectively received in said set screw openings.

2. The tethered pencil device of claim 1, wherein the set screw is received by the first threaded opening.

3. The tethered pencil device of claim 1, wherein the set screw is received by the second threaded opening.

4. The tethered pencil device of claim 1, wherein the set screw is received by the third threaded opening.

5. The tethered pencil device of claim 1, wherein the body is magnetic.

6. The tethered pencil device of claim 1, wherein the base is magnetic.

7. The tethered pencil device of claim 1, wherein a top surface of the base is comprised of a channel.

8. The tethered pencil device of claim 7, wherein the channel is comprised of a lipped channel.

9. The tethered pencil device of claim 1, wherein the body is comprised of a plastic material.

10. A method of using a tethered pencil device, the method comprising the following steps:

providing a tethered pencil device comprised of a body, a tether anchor, a base, an eraser, and a tip;

attaching the base to a desk via a fastener of the base;

placing a piece of lead into the body;

attaching the eraser to the tether anchor via a first pair of reciprocating fasteners and a first set screw;

attaching the tether anchor to the body via a second pair of reciprocating fasteners and a second set screw;

attaching the tip to the body via a third pair of reciprocating fasteners and a third set screw; and pressing a button of the tethered pencil device to push the piece of lead out of the tip.

* * * * *